United States Patent
Blakesley

[11] Patent Number: 6,161,891
[45] Date of Patent: Dec. 19, 2000

[54] VEHICLE SEAT WEIGHT SENSOR

[75] Inventor: Patrick B. Blakesley, Goshen, Ind.

[73] Assignee: CTS Corporation, Elkhart, Ind.

[21] Appl. No.: 09/422,382

[22] Filed: Oct. 21, 1999

[51] Int. Cl.[7] .............................. B60N 2/12; B60R 21/01; B60R 21/32
[52] U.S. Cl. ...................... 296/65.01; 296/68.1; 280/735
[58] Field of Search ............... 296/65.01, 65.13, 296/65.14, 68.1; 280/273, 735; 177/144, 136, 211, 199, DIG. 6, 210; 33/DIG. 13

[56] References Cited

U.S. PATENT DOCUMENTS

| | | | |
|---|---|---|---|
| 4,556,598 | 12/1985 | Bloom . | |
| 5,573,269 | 11/1996 | Gentry . | |
| 5,810,392 | 9/1998 | Gagnon | 280/735 |
| 5,865,463 | 2/1999 | Gagnon et al. | 280/735 |
| 5,906,393 | 5/1999 | Mazur et al. | 280/735 |
| 5,942,695 | 8/1999 | Verma et al. | 73/768 |
| 5,971,432 | 10/1999 | Gagnon et al. | 280/735 |
| 5,986,221 | 11/1999 | Stanley | 177/136 |
| 5,997,033 | 12/1999 | Gray et al. | 280/735 |
| 6,039,344 | 3/2000 | Mehney et al. | 280/735 |

*Primary Examiner*—D. Glenn Dayoan
*Assistant Examiner*—Greg Blankenship
*Attorney, Agent, or Firm*—Mark P. Bourgeois; Mark W. Borgman

[57] ABSTRACT

A vehicle seat weight sensor for sensing the weight of an occupant in a vehicle seat. The sensor includes a substrate that has a first and second end. The substrate is located between the seat bottom and the vehicle floor. Strain gauge resistors are located on the substrate for generating an electrical signal in response to the substrate being stressed by the weight of the seat occupant. The electrical signal changes as a function of the weight of the seat occupant. Several mounting configurations to the vehicle seat are shown.

9 Claims, 5 Drawing Sheets

VEHICLE SEAT WEIGHT SENSOR

CROSS REFERENCE TO RELATED AND CO-PENDING APPLICATIONS

This application is related to the following U.S. patent applications: U.S. patent application Ser. No. 09/374,874, filed Aug. 16, 1999 and titled, "Automobile seat weight Sensor".

U.S. patent application Ser. No. 09/374,870, filed Aug. 16, 1999 and titled, "Vehicle Occupant Position Detector and Airbag Control System".

The foregoing patents have the same assignee as the instant application and are herein incorporated by reference in their entirety for related and supportive teachings.

BACKGROUND OF THE INVENTION

1. Field of the Invention

This invention relates to an automobile weight sensor for detecting the presence of a person having a weight in a car seat, and in particular to a sensor that can detect the presence of an occupant using strain sensitive resistors and provide an electrical signal to control activation of an airbag.

2. Description of the Related Art

Various devices are well known for their ability to measure force, pressure, acceleration, temperature, position, by using a sensing structure combined with signal processing electronics. One general type of sensor or transducer for such applications is a resistive strain gauge sensor in which force or pressure is sensed or measured based on strain placed on the resistors. Resistive strain gauges function by exhibiting changes in resistance proportional to force which causes dimensional changes of the resistor.

Many types of strain gauge sensors have been designed and made commercially available. Various strain gauge sensors have proven to be generally satisfactory. Prior art sensors, however, tend to be rather expensive and not suitable in certain applications such as sensing the presence of an occupant in an automobile seat. A sensor suitable for such an application must be compact, robust, impervious to shock and vibration, yet inexpensive.

Automobile seats can use sensors to activate air bags, which would be deployed during an accident. Injury to infants or small children from air bag deployment with excessive force is a current industry problem. A weight sensor in the seat can be used to control the deployment force during air bag activation. If a heavy person is in the seat, the airbag is deployed at full force. If a light person is in the seat, such as a child, the airbag is deployed at a slower, less forceful rate or not at all. A current unmet need exists for a reliable, low cost, simple and robust automobile seat weight sensor that is used to control airbag deployment.

3. Related Art

Examples of patents that are related to the present invention are as follows, and each patent is herein incorporated by reference for the supporting teachings:

U.S. Pat. No. 5,573,269 is an apparatus for sensing and restraining an occupant of a vehicle seat.

U.S. Pat. No. 4,556,598 is a porcelain tape for producing porcelainized metal substrates.

The foregoing patents reflect the state of the art of which the applicant is aware and are tendered with the view toward discharging the applicant's acknowledged duty of candor in disclosing information which may be pertinent in the examination of this application. It is respectfully stipulated, however, that none of these patents teach or render obvious, singly or when considered in combination, the applicants claimed invention.

SUMMARY OF THE INVENTION

It is a feature of the invention to provide a reliable and cost-effective vehicle seat weight sensor for detecting the weight of a seat occupant. The sensor uses strain sensitive resistors.

An additional feature of the invention is to provide a vehicle seat weight sensor for sensing the weight of an occupant in a vehicle seat for use by an airbag control system. The seat has a seat back, a seat bottom and a seat bracket connected to a vehicle floor. A lower slide rail and an upper slide rail are coupled to the bracket and a seat pan is attached to the upper rail. The sensor includes a horizontally elongated substrate that is located between the seat bottom and the vehicle floor such that a portion of the weight of the seat occupant on the seat bottom is transferred from the seat bottom to the vehicle floor through the substrate. The substrate has a first and a second end. A neckdown region is formed in the substrate between the first and second ends for concentrating the weight of the vehicle occupant. Several strain gauge resistors are located on the neckdown region for generating an electrical signal in response to the substrate being stressed by the weight of the seat occupant. The electrical signal changes magnitude as a function of the weight of the seat occupant. The sensor can be located in several locations within the car seat. The substrate can be located between the upper slide rail and the seat pan. The substrate can be located between the lower slide rail and the seat bracket. The substrate can also be located between the lower seat rail and the vehicle floor.

An additional feature of the invention is to provide a vehicle seat weight sensor for sensing the weight of an occupant in a vehicle seat. The sensor includes a substrate that has a first and second end. At least one strain gauge resistor is located on the substrate for generating an electrical signal in response to the substrate being stressed. The electrical signal changes as a function of the weight of the seat occupant. A connection mechanism is located at the first and second ends of the substrate to connect the substrate to the vehicle seat.

The invention resides not in any one of these features per se, but rather in the particular combination of all of them herein disclosed and claimed and it is distinguished from the prior art in this particular combination of all of its structures for the functions specified. Other features of the present invention will become more clear from the following detailed description of the invention, taken in conjunction with the accompanying drawings and claims, or may be learned by the practice of the invention.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 1:
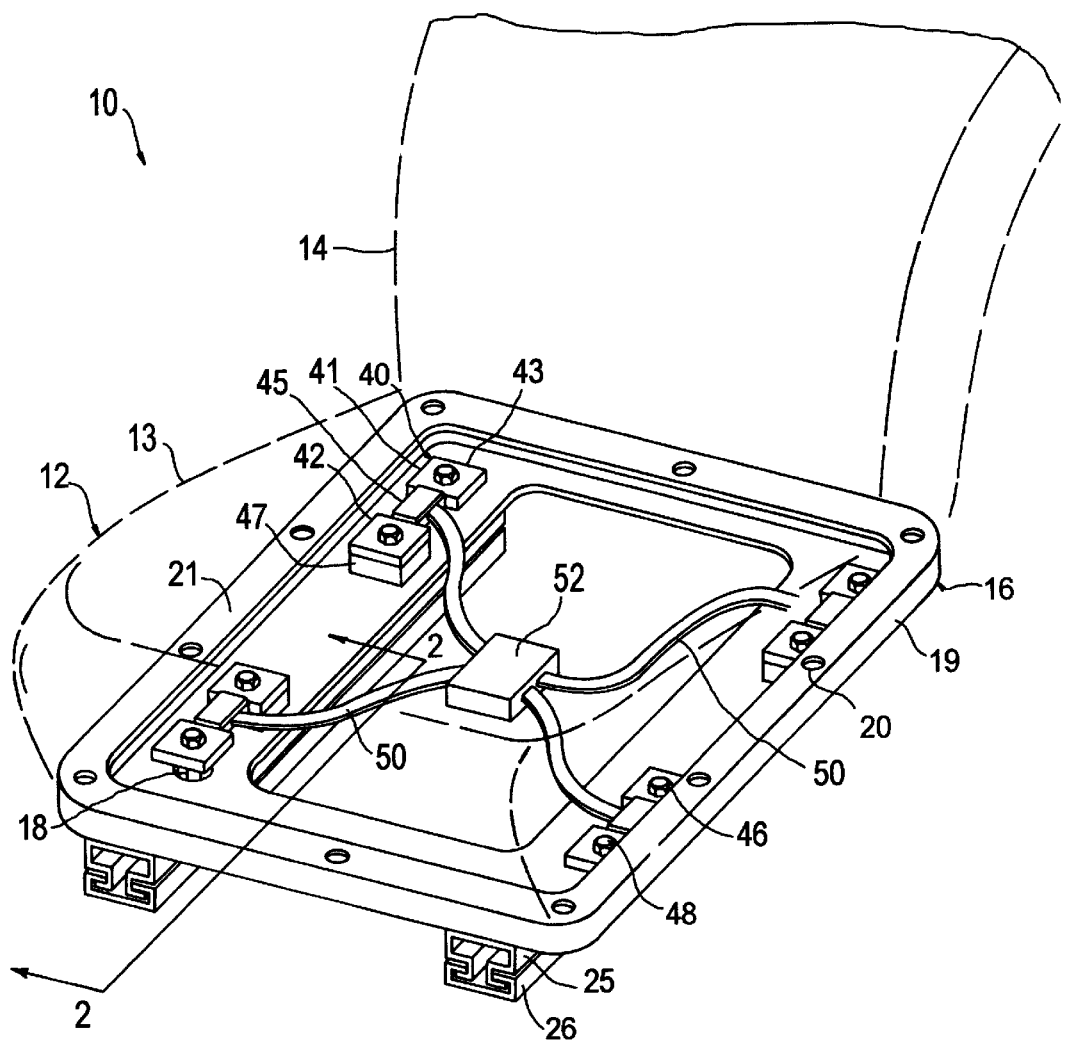
FIG. 1 is a perspective view of the preferred embodiment of an automobile seat weight sensor in an automobile seat.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings. In the drawings like numbering represents like elements between the drawings.

DETAILED DESCRIPTION OF THE PREFERRED EMBODIMENTS

Figure 2:
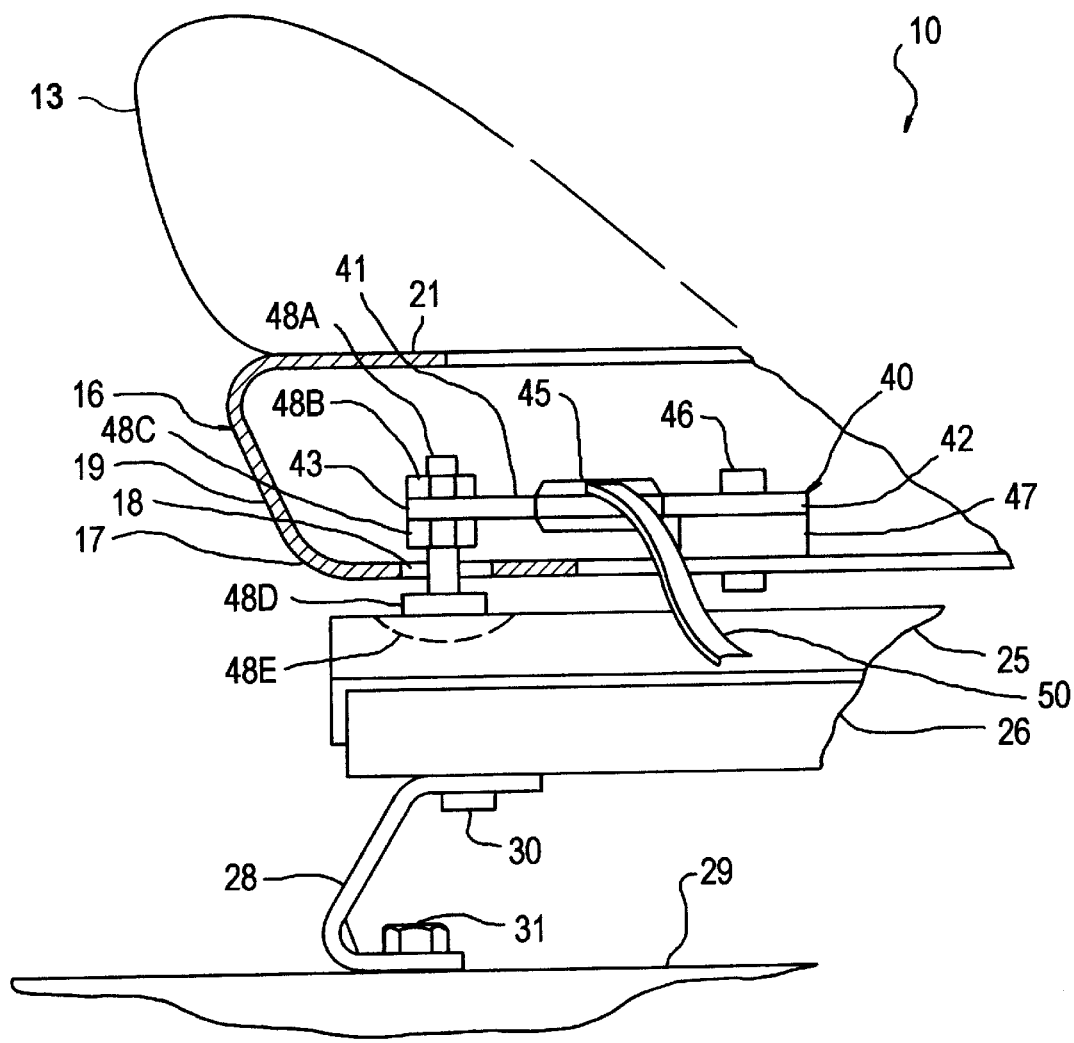
FIG. 2 is a partial cross-sectional side view of ;a FIG. 1 looking at the sensor from the inside of the seat along line 2—2.

The present invention provides a vehicle weight sensor for detecting the weight of a seat occupant. Referring to FIGS. 1 and 2, there is a seat assembly 10 shown. Seat assembly 10 has a seat 12 with a seat back 14, and a seat bottom 13. A seat pan 16 is located between the an upper slide rail 25 and seat bottom 12. Seat pan 16 has seat pan bottom 17 that has a seat pan clearance aperture 18 formed therein. A seat pan outer rim 19 runs around the outside perimeter of seat pan 16. A seat lip 21 extends inwardly from outer rim 19. Seat pan fasteners 20 are used to attach seat bottom 13 to seat pan 16. A lower slide rail 26 is slidably attached to upper slide rail 25 by roller bearings (not shown). The slide rails 25 and 26 allow seat assembly 10 to slide forward and backwards in a vehicle. The lower slide rail 26 is attached to seat bracket 28 by a fastener 30 such as a bolt or rivet. The seat bracket 28 is attached to a vehicle floor 29 by a fastener 31 such as a bolt or rivet.

Four weight sensor assemblies 40 are shown mounted at the four corners of seat assembly 10 between seat pan 16 and upper slide rail 25. Sensor 40 has a metal substrate 41 with two ends, a first end 42 and a second end 43. A cover coating 45 is located in the middle of sensor 40. A substrate to seat pan fastener 46 is used to attach the substrate first end 42 to the seat pan 16. Fastener 46 can be a bolt and nut or a bolt and a threaded hole or can be a rivet. A spacer 47 is located between first end 42 and seat pan bottom 17. A substrate to upper slide rail threaded fastener 48A is used to attach the substrate to the upper slide rail. Fastener 48A passes through clearance aperture 18. A nut 48B is located above substrate 41 and another nut 48C is located below substrate 41. Nuts 48B and 48C are tightened to securely hold fastener 48A to substrate 41. Fastener 48A has a standoff 48D located above the upper slide rail 25 between the upper slide rail 25 and the seat pan 16. A swaged head 48E is shown in phantom inside slide rail 25. Swaged head 48E and standoff 48D securely attach fastener 48A to upper slide rail 25. Fastener 48A could also use threaded holes in substrate 41 or slide rail 25 instead of nuts if desired.

When an occupant sits on seat bottom 12, the seat occupant's weight is transferred from seat bottom 12 to seat pan 16, through sensor 40, to upper slide rail 25, then to lower slide rail 26, then to seat bracket 28 and then to floor 29. The entire weight of the seat occupant is transferred as a force through the four sensors 40. This weight causes strain in sensor 40 and is measured by sensor 40. An electrical output signal is generated and transmitted over a wire harness 50 to a conventional air bag controller (not shown). The air bag controller then can control deployment of the airbag based upon the seat occupants weight. The wiring harnesses 50 from four sensors 40 are connected together at a junction box 52 in the center of the seat. The junction box 52 would be connected by another wiring harness (not shown) to a conventional airbag controller. Junction box 52 allows for convenient attachment of a single connector to connect with all four sensors 40.

Figure 3:
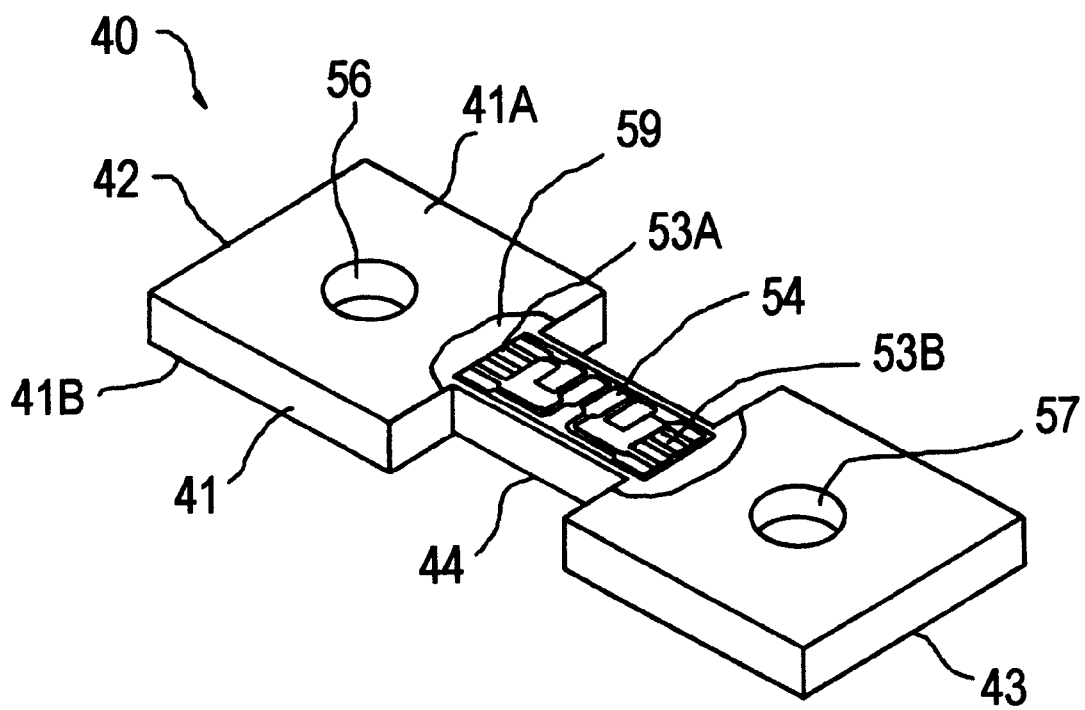
FIG. 3 is a perspective view of the sensor.

Referring additionally to FIG. 3, more details of the sensor assembly 40 are shown. Sensor assembly 40 has a metal substrate 41 with an upper surface 41A and a bottom surface 41B. Substrate 41 is generally elongated and dog boned shaped. Substrate 41 is preferably formed from 430 stainless steel. Substrate 41 has a first end 42, a second end 43 and a neckdown region 44 located between first end 42 and second end 43. A first end aperture 56 is located in the first end 42 and a second end aperture 57 are located in the second end 43. Fasteners 46 and 48A pass through apertures 56 and 57, respectively. Several strain gauge resistors 53A and 53B are arranged on surface 41A at the junction of the neckdown region and the first and second end, respectively. Similarly, resistors 53C and 53D (not shown) are located on the bottom surface 41B. An insulative dielectric layer 59 is shown disposed on top surface 41A. Similarly, layer 59 would be disposed on bottom surface 41B. On top of the dielectric layer 59, the strain gauge resistors 53A–D are formed. Resistors 53A–D are strain sensitive and will change resistance based on the amount of strain in substrate 41. Output pads 54 are connected to resistors 53A–D. The output pads 54 are used to solder to the individual wires in wiring harness 50. Cover coat 45 is placed over resistors 53A–D and pads 54. The cover coat protects the resistors from damage and acts as a solder mask. Dielectric layer 59, Resistors 53A–D and pads 54 can be formed from conventional thick film materials using conventional thick film screening and processing techniques. Dielectric layer 59, Resistors 53A–D and pads 54 can also be formed from a ceramic green tape. Such methods of forming resistors on metal substrates are detailed in U.S. Pat. No. 4,556,598 titled, "A porcelain tape for producing porcelainized metal substrates", the contents of which are specifically herein incorporated by reference.

In a typical configuration, Resistors 53A and 53C would be connected to form a half bridge circuit (not shown) that is well known in the art and resistors 53B and 53D would be connected to form another half of a bridge circuit that is well known in the art. The two half bridges would be connected to form a conventional full bridge circuit.

Figure 4:
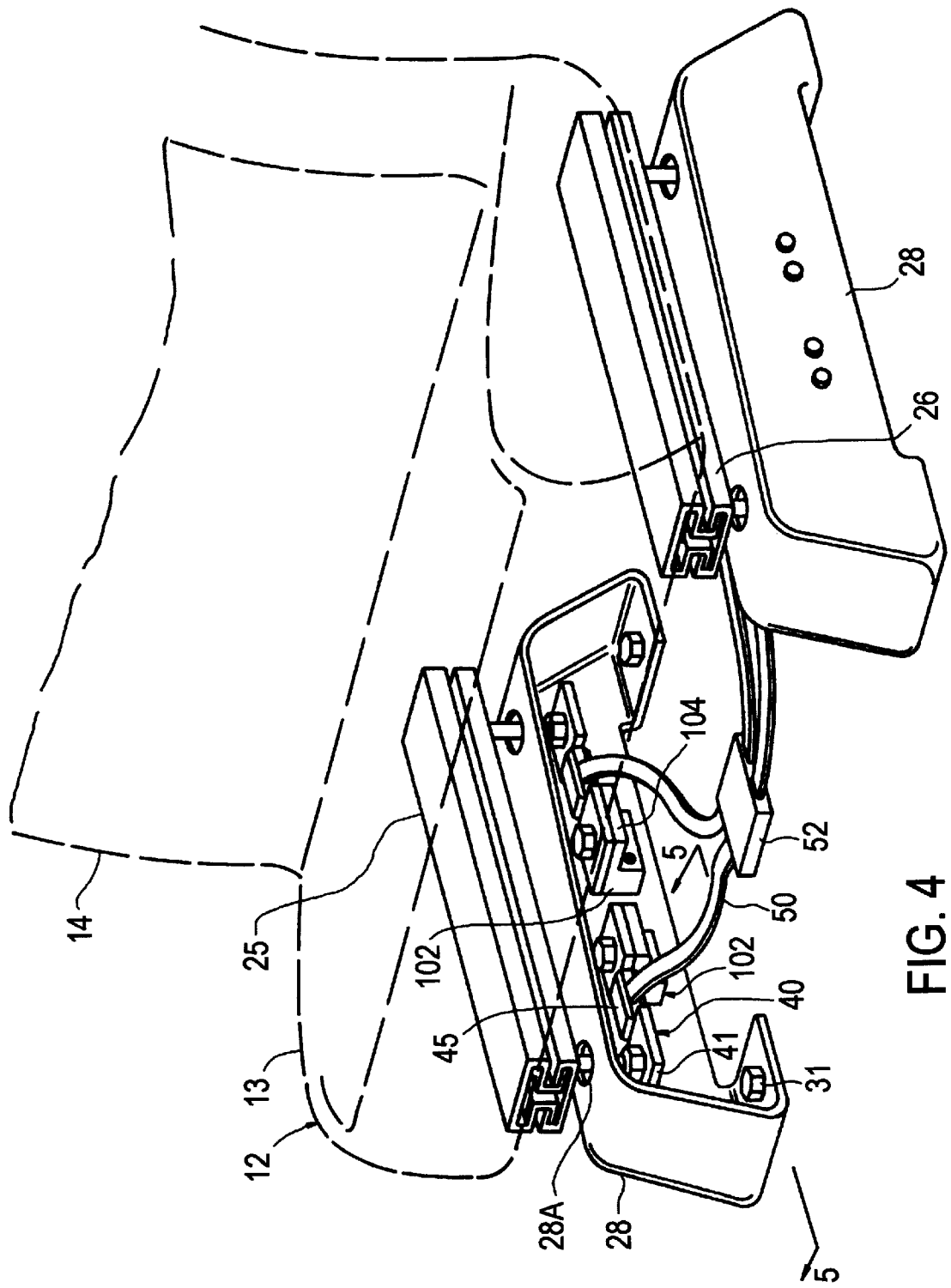
FIG. 4 is a perspective view of an alternative embodiment of an automobile seat weight sensor in an automobile seat.
Figure 5:
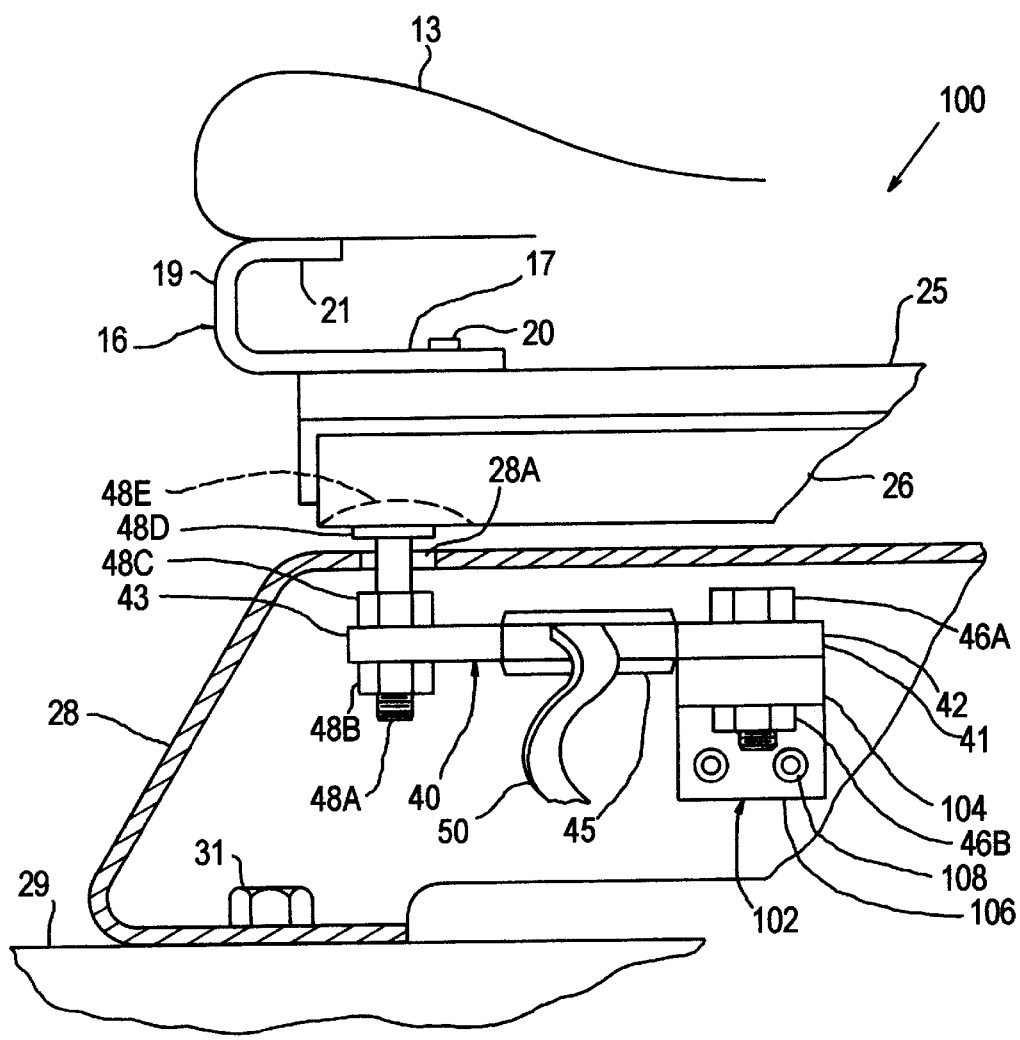
FIG. 5 is a partial cross sectional side view of FIG. 4 looking at the sensor from the inside of the seat along line 5—5.

Referring to FIGS. 4 and 5, there is a perspective view of an alternative embodiment of an automobile seat assembly 100 shown. Seat assembly 100 has a seat 12 with a seat back 14, and a seat bottom 13. A seat pan 16 is located between the an upper slide rail 25 and seat bottom 12 (omitted for clarity from FIG. 4). Seat pan 16 has seat pan bottom 17. A seat pan outer rim 19 runs around the outside perimeter of seat pan 16. A seat lip 21 extends inwardly from outer rim 19. Seat pan fasteners 20 are used to attach seat pan 16 to upper rail 25. A lower slide rail 26 is slidably attached to upper slide rail 25 by roller bearings (not shown). The slide rails 25 and 26 allow seat assembly 10 to slide forward and backwards in a vehicle. Seat brackets 28 on each side of the seat are attached to a vehicle floor 29 by a fastener 31 such as a bolt or rivet. A seat bracket clearance aperture 28A is located in bracket 28.

Four weight sensor assemblies 40 are shown mounted at the four corners of seat assembly 100 between lower slide rail 26 and bracket 28. The sensor 40 of FIGS. 4 and 5 is the same as was detailed for FIGS. 1 and 2. Sensor 40 has a metal substrate 41 with two ends, a first end 42 and a second end 43. A cover coating 45 is located in the middle of sensor 40. An angled support 102 has a lower section 106 and an upper section 104. Fasteners 108 are used to attach support 102 to seat bracket 28. First end 42 of substrate 41 rests on upper section 104. A substrate to support fastener 46A and nut 46B is used to attach the substrate first end 42 to the support 102. Fastener 46 can be a bolt and nut or a bolt and a threaded hole or can be a rivet. A substrate to lower slide rail threaded fastener 48A is used to attach the substrate second end 43 to the lower slide rail 26. Fastener 48A passes through clearance aperture 28A. A nut 48B is located below substrate 41 and another nut 48C is located above substrate 41. Nuts 48B and 48C are tightened to securely hold fastener 48A to substrate 41. Fastener 48A has a standoff 48D located below the lower slide rail 26 between the lower slide rail 26 and the bracket 28. A swaged head 48E is shown in phantom inside slide rail 26. Swaged head 48E and standoff 48D securely attach fastener 48A to slide rail 26. Fastener 48A could also use threaded holes in substrate 41 or slide rail 26 instead of nuts if desired.

When an occupant sits on seat bottom 12, the seat occupant's weight is transferred from seat bottom 12 to seat pan 16 and upper slide rail 25, then to lower slide rail 26, through sensor 40, to support 102, then to seat bracket 28 and then to floor 29. The entire weight of the seat occupant is transferred as a force through the four sensors 40 at each corner of the seat. This weight causes strain in sensor 40 and is measured by the strain gauge resistors 53A–D. An electrical output signal is generated and transmitted over a wire harness 50 to a conventional air bag controller (not shown). The air bag controller then can control deployment of the airbag based upon the seat occupant's weight. The wiring harnesses 50 from four sensors 40 are connected together at a junction box 52 in the center of the seat. The junction box 52 would be connected by another wiring harness (not shown) to a conventional airbag controller. Junction box 52 allows for convenient attachment of a single connector to connect with all four sensors 40.

Remarks About the Preferred Embodiment

When an occupant sits on seat bottom 12, the seat occupant's weight is transferred from seat bottom 12 to seat pan 16, through sensor 40, to upper slide rail 25, then to lower slide rail 26, then to seat bracket 28 and then to floor 29. The entire weight of the seat occupant is transferred as a force through the four sensors 40. This weight causes strain and flex in sensor 40. A voltage is applied to the resistor. The strain on the resistors causes the voltage or electrical output signal across the resistors to change as a function of the weight of the seat occupant. The resistors are connected together in a bridge configuration. The output of the bridge is transmitted over wire harness 50 to a conventional air bag controller (not shown). The air bag controller then can control deployment of the airbag based upon the seat occupants weight. Typically, the air bag is disengaged or turned off below a minimum weight. The air bag deploys with less force for a lighter person and more force for a heavier person.

Variations of the Preferred Embodiment

Although the illustrated embodiment shows resistors 53A–D on the top and bottom surface of substrate 41, more or fewer resistors could be used. If desired, the resistors could be placed on only one surface of substrate 41.

The weight sensor shown used a thick film resistor, one skilled in the art will realize that the preferred embodiment would work with other types of resistors. For example, discrete chip resistors could be attached to substrate 41 or thin film resistors could be used. Furthermore, the shape of substrate 41 could be varied to any configuration that would transfer the weight from the seat and concentrate it in the desired location on the substrate.

Although sensor assembly 40 was shown without a housing, it is contemplated to add a housing.

Another variation of the weight sensor would be to utilize other electrical connections. For example, other types of connectors or terminals could be used in place of wire harness 50.

Yet, a further variation, would be to place signal conditioning circuitry on substrate 41 to amplify and filter the electrical signal before it is transmitted to the airbag controller.

The illustrated embodiment showed the use of the weight sensor in an automobile seat. It is contemplated to utilize the weight sensor in other occupant weight sensing applications such as chairs, sofas, scales, beds and mattresses, hospital equipment, cribs, airplane seats, train seats, boat seats, amusement rides, and theater seats.

While the invention has been taught with specific reference to these embodiments, someone skilled in the art will recognize that changes can be made in form and detail without departing from the spirit and the scope of the invention. The invention should therefore be limited only by the scope of the human imagination. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vehicle seat weight sensor for sensing weight of an occupant in a vehicle seat, the seat having a seat back, a seat bottom and a seat bracket connected to a vehicle floor, a lower slide rail, and an upper slide rail coupled to the seat bracket and a seat pan attached to the upper rail, the vehicle seat weight sensor comprising:

a) a substrate, having a first and second end, the first end attached to the lower slide rail and the second end attached to the seat bracket such that forces applied to the seat bottom are transferred from the lower slide rail to the seat bracket through the substrate;

b) a plurality of strain gauge resistors, located on the substrate, for generating an electrical signal in response to the substrate being stressed, the electrical signal changing magnitude as a function of the weight of the occupant; and c) a first fastener connected between the first end and the lower slide rail and a second fastener connected between the second end and the seat bracket.

2. The vehicle seat weight sensor according to claim 1, wherein the substrate has a neck down region for concentrating the forces onto the strain gauge resistors.

3. The vehicle seat weight sensor according to claim 1, wherein the substrate has apertures at the first and second ends of the substrate.

4. The vehicle seat weight sensor according to claim 1, wherein the electrical signal is used to control activation of an airbag.

5. A vehicle seat weight sensor for sensing weight of an occupant in a vehicle seat for use by an airbag control system, the seat having a seat back, a seat bottom and a seat bracket connected to a vehicle floor, a lower slide rail, and an upper slide rail coupled to the seat bracket and a seat pan attached to the upper rail, the improvement comprising: at least one generally horizontally elongated substrate, having a first and second end, said first end attached to said lower slide rail and said second end attached to said seat bracket such that a portion of forces applied to said seat bottom are transferred from said lower slide rail to said seat bracket through said substrate; a neckdown region formed in said substrate between said first and second ends for concentrating said forces thereon; a plurality of strain gauge resistors, located on said neckdown region of said substrate, for generating an electrical signal in response to said substrate being stressed, said electrical signal changing magnitude as a function of the weight of said occupant; and fastener means, connected between said first end and said lower slide rail and between said second end and said seat bracket for connecting said substrate to said seat.

6. A vehicle seat weight sensor for sensing weight of an occupant in a vehicle seat for use by an airbag control system, the seat having a seat back, a seat bottom and a seat bracket connected to a vehicle floor, a lower slide rail, and an upper slide rail coupled to the seat bracket and a seat pan attached to the upper rail, the sensor comprising:
   a) at least one generally horizontally elongated substrate, disposed between said seat bottom and said vehicle floor such that a portion of the weight of said occupant on said seat bottom is transferred from said seat bottom to said vehicle floor through said substrate, said substrate having a first and a second end;
   b) a neckdown region formed in said substrate between said first and second ends for concentrating the weight of said occupant thereon; and
   c) a plurality of strain gauge resistors, located on said neckdown region of said substrate, for generating an electrical signal in response to said substrate being stressed by the weight of said occupant, said electrical signal changing magnitude as a function of the weight of said occupant.

7. The vehicle seat weight sensor according to claim 6, wherein the substrate is located between said upper slide rail and said seat pan.

8. The vehicle seat weight sensor according to claim 6, wherein the substrate is located between said lower slide rail and said seat bracket.

9. The vehicle seat weight sensor according to claim 6, wherein the substrate is located between said lower seat rail and said vehicle floor.

\* \* \* \* \*